(12) United States Patent
Chou

(10) Patent No.: US 7,277,563 B2
(45) Date of Patent: Oct. 2, 2007

(54) CAPACITIVE MICRO PRESSURE SENSING MEMBER AND FINGERPRINT SENSOR USING THE SAME

(75) Inventor: Bruce C. S. Chou, Hsin Chu (TW)

(73) Assignee: LighTuning Tech, Inc., Hsinchu (TW)

( * ) Notice: Subject to any disclaimer, the term of this patent is extended or adjusted under 35 U.S.C. 154(b) by 826 days.

(21) Appl. No.: 10/638,371

(22) Filed: Aug. 12, 2003

(65) Prior Publication Data
US 2004/0046574 A1   Mar. 11, 2004

(30) Foreign Application Priority Data
Aug. 13, 2002   (TW) ............................ 91118142 A

(51) Int. Cl.
*G06K 9/00* (2006.01)
(52) U.S. Cl. .................................... 382/124
(58) Field of Classification Search ........ 382/115–127; 235/380, 382, 382.5; 340/5.53, 5.83
See application file for complete search history.

(56) References Cited
U.S. PATENT DOCUMENTS

| | | | |
|---|---|---|---|
| 5,940,526 A * | 8/1999 | Setlak et al. ................ | 382/124 |
| 6,671,392 B1 * | 12/2003 | Shigematsu et al. ........ | 382/124 |
| 6,683,971 B1 * | 1/2004 | Salatino et al. ............. | 382/124 |
| 6,889,565 B2 * | 5/2005 | DeConde et al. ....... | 73/862.042 |
| 7,013,031 B2 * | 3/2006 | Kim et al. .................. | 382/124 |

* cited by examiner

*Primary Examiner*—Vikkram Bali
(74) *Attorney, Agent, or Firm*—Birch, Stewart, Kolasch & Birch, LLP

(57) ABSTRACT

A capacitive micro pressure sensing member and a fingerprint sensor using the same. The sensing member includes a substrate, a first suspended structure, a first protrusion structure, and a second suspended structure. The first suspended structure is located above the substrate and includes a suspended thin plate and at least one compliant suspension arm connected to the suspended thin plate, which is movable so that a distance from the suspended thin plate to the substrate is changed. The first protrusion structure is arranged at a center portion of a top surface of the suspended thin plate. The second suspended structure is arranged on a top surface of the first protrusion structure with a center portion of the second suspended structure contacting the first protrusion structure. The second suspended structure covers the first suspended structure to form a sealed chamber together with the substrate.

9 Claims, 7 Drawing Sheets

CAPACITIVE MICRO PRESSURE SENSING MEMBER AND FINGERPRINT SENSOR USING THE SAME

This nonprovisional application claims priority under 35 U.S.C. § 119(a) on Patent Application No(s). 091118142 filed in TAIWAN, R.O.C. on Aug. 13, 2002, which is(are) herein incorporated by reference.

BACKGROUND OF THE INVENTION

1. Field of the Invention

The invention relates to a micro pressure sensor, and more particularly to a micromachined capacitive pressure sensor with a two-level suspended structure, wherein the micro pressure sensor is applied to the fluid pressure detection, the tactile pressure detection, and particularly the fingerprint pattern detection. Detailed descriptions regarding the capacitive pressure fingerprint sensor may be found in a commonly-owned, co-pending U.S. patent application Ser. No. 10/434,833, filed May 13, 2003 and entitled "PRESSURE TYPE FINGERPRINT SENSOR FABRICATION METHOD," and a commonly-owned, co-pending Taiwan Patent Application No. 090112023, filed May 17, 2001 and entitled "CAPACITIVE MICRO PRESSURE SENSING MEMBER, METHOD FOR MANUFACTURING THE SAME, AND METHOD FOR READING SIGNALS THEREOF."

2. Description of the Related Art

There are many methods for manufacturing capacitive pressure sensors using the micro-electro-mechanical system (MEMS) technology including the bulk micromachining and the surface micromachining. However, the structure of the sensor never departs from a capacitor composed of a pair of parallel plates, and a reference pressure chamber sealed between the parallel plates, as shown in FIG. 1, which is briefly a structural cross-sectional view showing a typical capacitive micro pressure sensing member 10. The capacitive micro pressure sensing member 10 includes a variable capacitor, which is composed of a pair of parallel plates and comprises a floating electrode 12 and a fixed electrode (not shown) located above a substrate 14. A sealed chamber 16 having a reference pressure P0 is formed between the floating electrode 12 and the substrate 14. When the external pressure P1 is different from the pressure P0 in the sealed chamber 16, as shown in FIG. 2, a force due to the pressure difference is induced to the floating electrode 12 and cause it to deform. Since the boundary of the floating electrode 12 is connected and fixed to the substrate 14, the maximum deformation d occurs at the center of the floating electrode 12, the zero deformation occurs at the boundary of the floating electrode, and the magnitude of deformation decreases from the center to the fixed boundary of the floating electrode. The critical feature of the structure is that the capacitance variation owing to the pressure difference of this conventional parallel-plate capacitive micro pressure sensing member is limited to the nonlinear deformation of the floating electrode plate, and the sensitivity of the sensing member 10 is also limited accordingly.

Since the capacitance is directly proportional to the overlapped area of the pair of parallel plates and inversely proportional to the gap between the two parallel plates, one typical method is to enlarge the area of the floating electrode 12 to solve the problem. However, this method increases the chip cost. Alternatively, another typical method is to reduce the gap length of the parallel-plate capacitor using the surface micromachining technology. However, this further causes another problem of film deformation under residual stresses or another problem of sticking the diaphragm structure onto the substrate.

Consequently, the invention solves the above-mentioned problems by providing a novel micro pressure sensing member having a two-level suspended structure including an electrode plate having a maximum translation displacement to generate a maximum sense capacitance variation and enhance the sensitivity when the external pressure changes. The capacitive micro pressure sensing members also may be formed into an array, which may be applied to a fingerprint sensor and precisely recognize the ridge shape of the fingerprint.

SUMMARY OF THE INVENTION

An object of the invention is to provide a capacitive micro pressure sensing member using a two-level suspended structure, wherein the center of a second suspended structure layer generates a maximum deformation displacement to translate a first suspended structure layer when the external pressure changes. Thus, the whole first suspended structure layer also generates a maximum translation displacement to obtain a maximum sense capacitance variation and effectively enhance the sensitivity.

Another object of the invention is to reduce the area of the sensing member with good sensitivity so that it may be used in fluid pressure detection, or even a tactile pressure detection.

Still another object of the invention is to provide a pressure fingerprint sensor including a capacitive micro pressure sensing members array located on a chip for sensing the ridge pressure of a fingerprint. Using the capacitance curve, which corresponds to the ridge and is left on the pressure fingerprint sensor, may precisely recognize the ridge shape of the fingerprint.

According to one aspect of the invention, a capacitive micro pressure sensing member includes a substrate, a first suspended structure located above the substrate and including a suspended thin plate and at least one compliant suspension arm connected to the suspended thin plate, a first protrusion structure arranged at a center portion of a top surface of the suspended thin plate, and a second suspended structure arranged on a top surface of the first protrusion structure with a center portion of the second suspended structure contacting the first protrusion structure. The second suspended structure covers the first suspended structure to form a sealed chamber together with the substrate. The suspended thin plate is movable in the sealed chamber relative to the substrate so that a distance from the suspended thin plate to the substrate is changed.

According to another aspect of the invention, a fingerprint sensor includes a substrate and a plurality of capacitive micro pressure sensing members, each of which is stated above and arranged on a top surface of the substrate. The micro-sensing members are arranged in a two-dimensional array to form a pressure sensing members array.

DETAILED DESCRIPTION OF THE INVENTION

Figure 3:
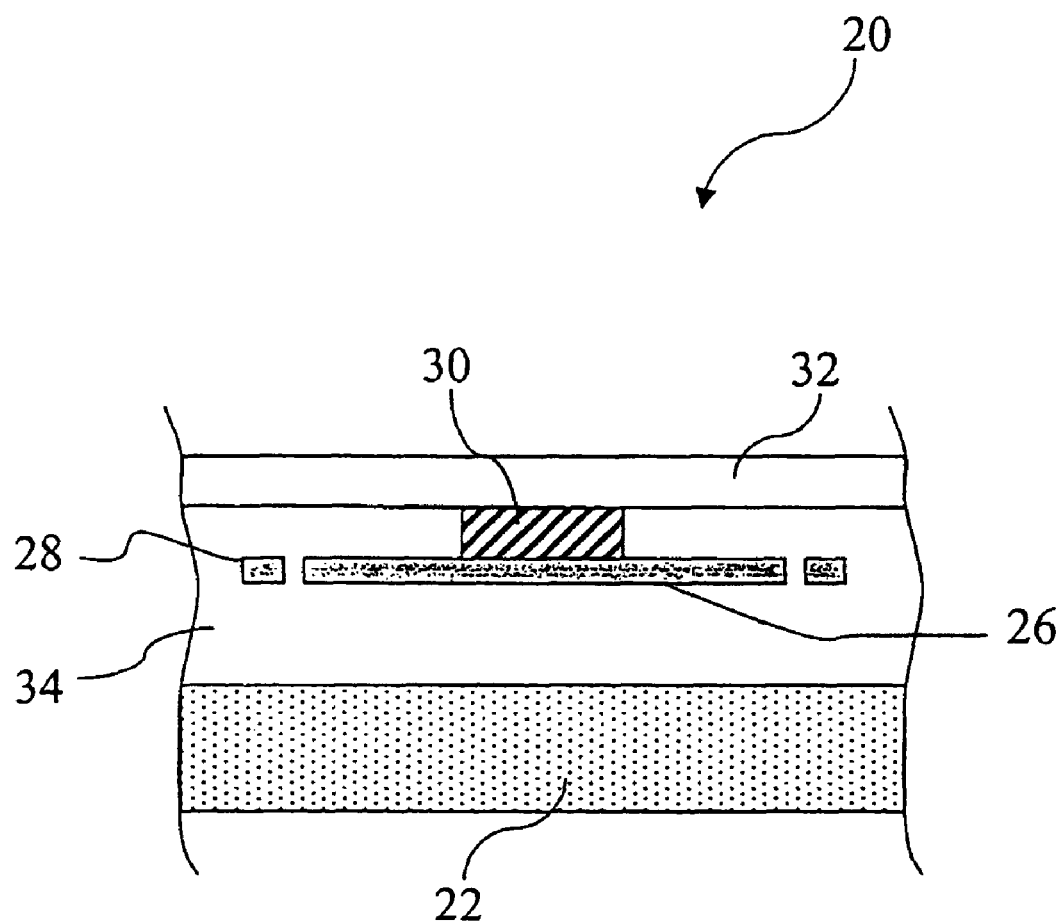
FIG. 3 is a structural cross-sectional view showing a capacitive micro pressure sensing member of the invention.
Figure 4:
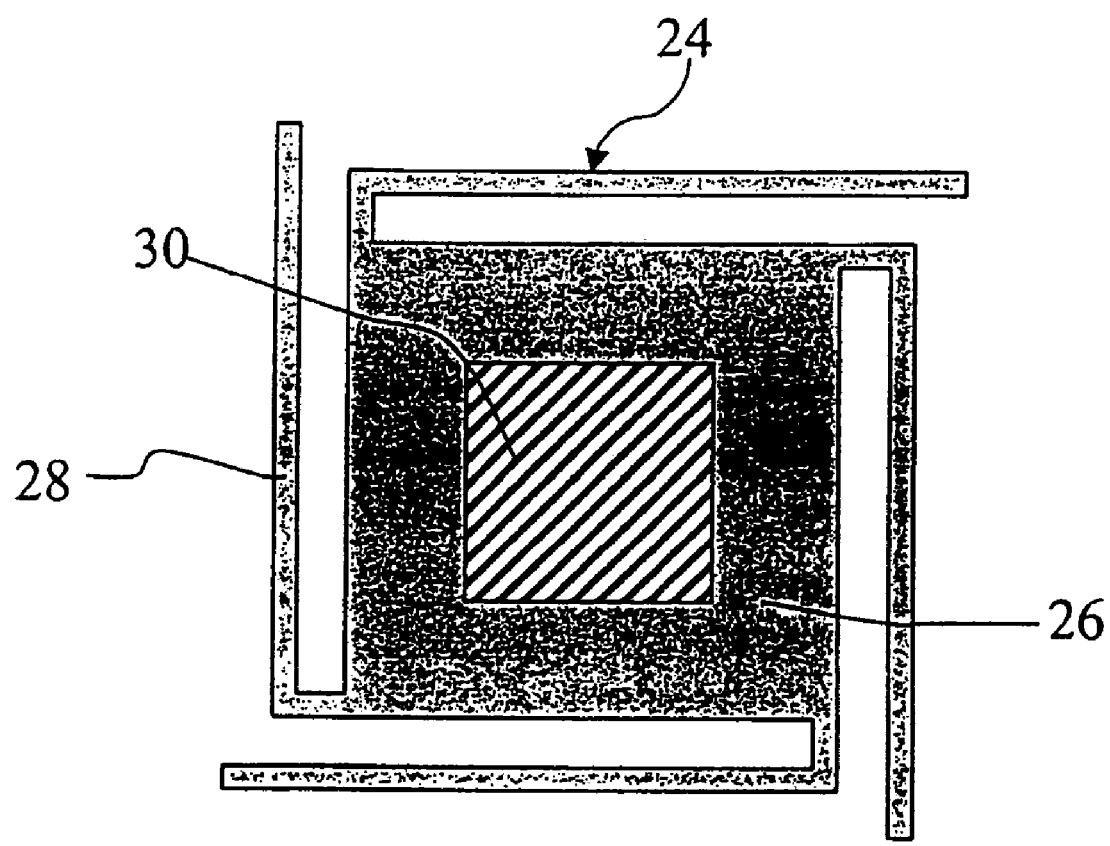
FIG. 4 is a top view showing a first suspended structure layer and a first protrusion structure of the capacitive micro pressure sensing member of the invention.

The two-level capacitive micro pressure sensing member of the invention includes a two-level suspended structure, as shown in FIGS. 3 and 4, which show a structural cross-sectional view and a partially structural top view of the invention, respectively. The capacitive micro pressure sensing member 20 includes a substrate 22, a first suspended structure layer 24 located above the substrate 22, and a second suspended structure layer 32. The first suspended structure layer 24 includes a suspended thin plate 26 and four compliant suspension arms 28 extending externally from four corners of the boundary of the plate 26 in directions parallel to the suspended thin plate 26. The compliant suspension arms 28 are connected to the suspended thin plate 26. The compliant suspension arms 28 stably support and suspend the suspended thin plate 26 above the substrate 22. A floating electrode (not shown) is included in the suspended thin plate 26 to form a sense capacitor between the substrate 22 and the floating electrode. A first protrusion structure 30 is arranged at a center position of a top surface of the suspended thin plate 26. The second suspended structure layer 32 is arranged on a top surface of the first protrusion structure 30 with a center portion of the second suspended structure layer 32 contacting the first protrusion structure 30 or with a small gap left therebetween. The second suspended structure layer 32 is a diaphragm structure for covering the first suspended structure layer 24 to form a sealed chamber 34 together with the substrate 22. The suspended thin plate 26 is movable in the sealed chamber 34 relative to the substrate 22 so that a distance from the suspended thin plate 26 to the substrate 22 is changed. It is to be noted that a second protrusion structure (not shown) may be further arranged on a top surface of the second suspended structure layer 32 to serve as a stress concentration point when the pressure is applied.

Figure 5:
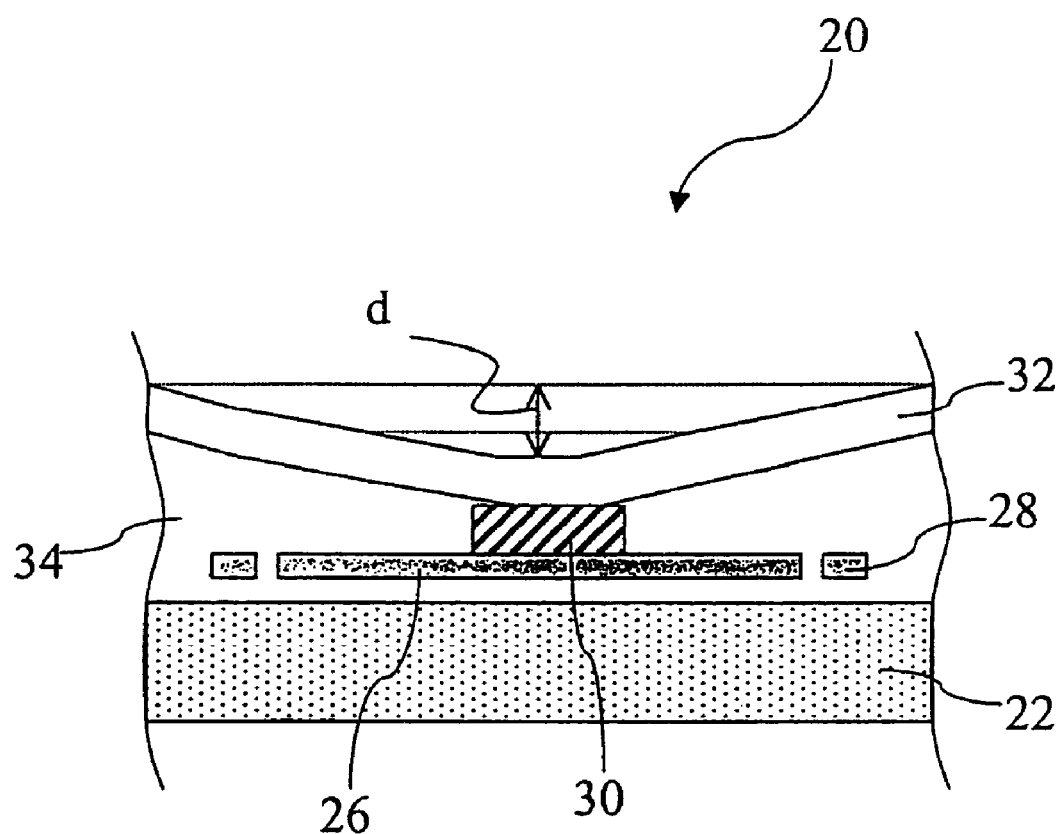
FIG. 5 is a schematic illustration showing the operation of the capacitive micro pressure sensing member of the invention under the external pressure.

FIG. 5 is a schematic illustration showing the operation of the invention. When the external pressure changes, the center of the second suspended structure layer 32 has a maximum deformation displacement d to cause the suspended thin plate 26, which is elastically supported by the compliant suspension arms 28, to move downward along a substantially vertical direction and to make the whole first suspended structure layer 24 generate the translation displacement d. Consequently, the capacitive micro pressure sensing member 20 of the invention may generate a maximum sense capacitance variation.

Figure 6:
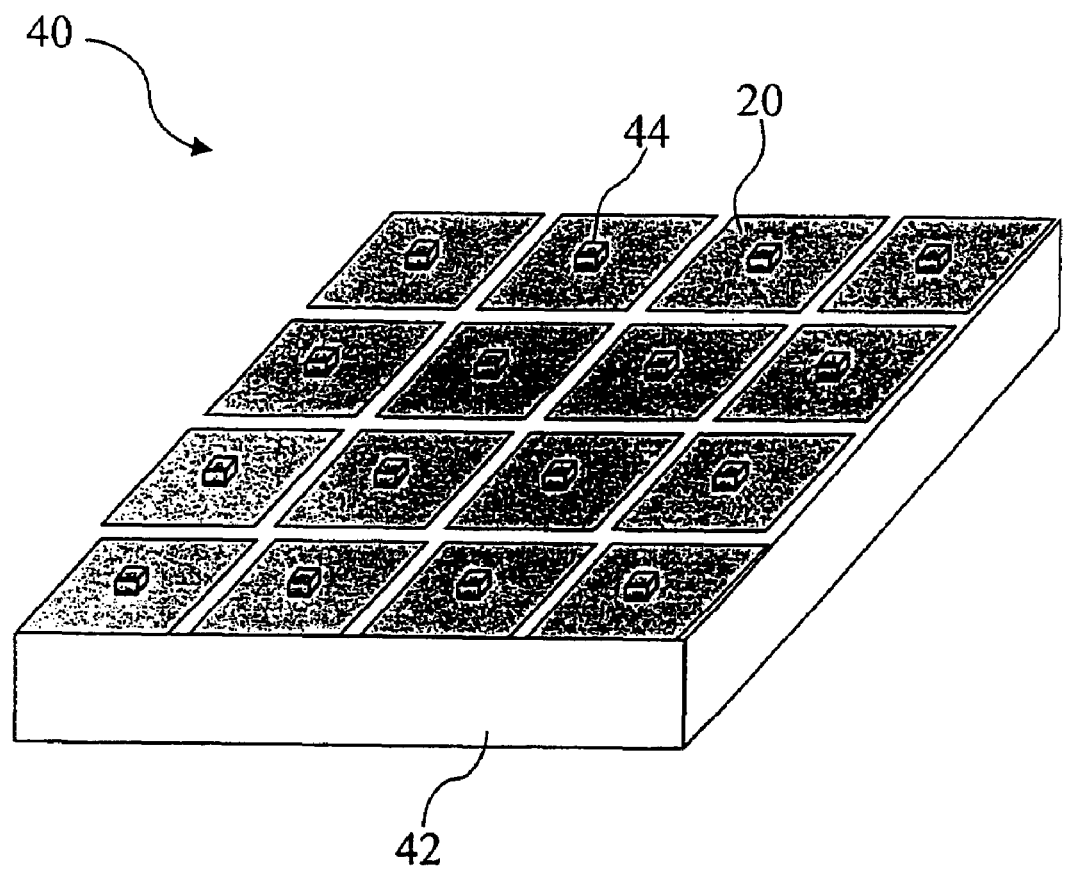
FIG. 6 shows an embodiment using several capacitive micro pressure sensing members of the invention.

The great advantage of the invention is that good sensitivity may be maintained with reduced area of the sensing member. Thus, in addition to replacing the typical pressure sensing member for fluid pressure detection, the sensing member of the invention also may be spread over the novel tactile pressure detection, and particularly the fingerprint ridge pressure detection. When the capacitive micro pressure sensing members 20 are arranged in a two-dimensional array, a pressure fingerprint sensor 40 may be formed, as shown in FIG. 6, which is a pictorial view showing the pressure fingerprint sensor 40 of the invention. The pressure fingerprint sensor 40 includes a silicon substrate 42 and a plurality of capacitive micro pressure sensing members 20, which is arranged on a top surface of the silicon substrate 42 and arranged in a two-dimensional array to form a pressure sensing members array. The above-mentioned second protrusion structure 44 is arranged on a top surface of each capacitive micro pressure sensing member 20 to serve as a stress concentration point contacting the fingerprint ridge and enlarge the displacement of the second suspended structure layer 32 under forces. Thus, the capacitance variation may be maximized, and the sensitivity may be enhanced.

Figure 7:
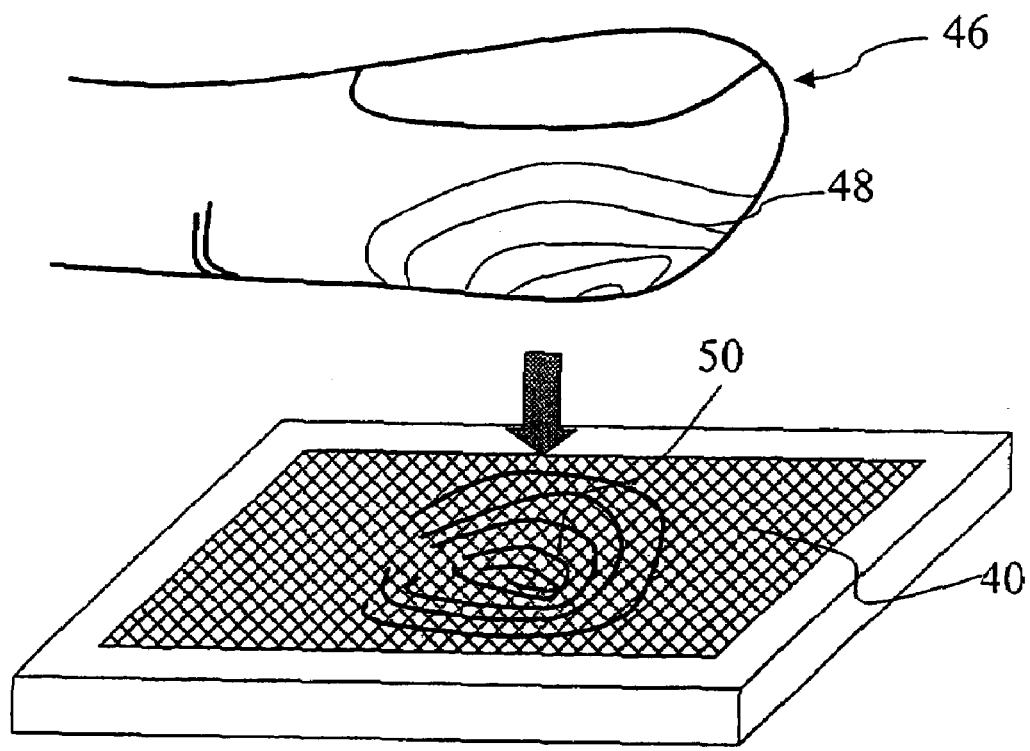
FIG. 7 is a schematic illustration showing a fingerprint sensor using the capacitive micro pressure sensing members of the invention.

When a finger 46 contacts the pressure fingerprint sensor 40, as shown in FIG. 7, the irregular-shaped ridges 48 on the surface of the finger 46 contact a portion of the capacitive micro pressure sensing members 20, and capacitance curves 50 corresponding to the ridges 48 may be left on the pressure fingerprint sensor 40. Reading the shapes of the capacitance curves 50 may reproduce the original shapes of the fingerprint ridges 48.

Figure 1:
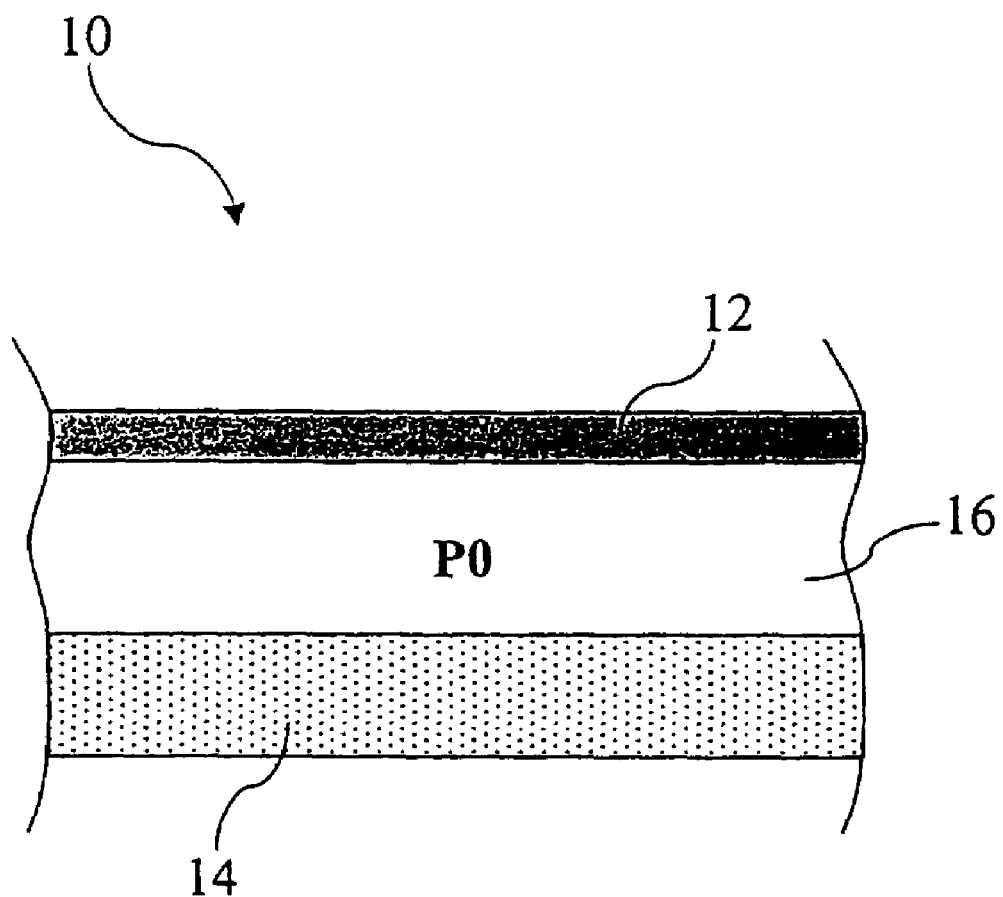
FIG. 1 is a schematic illustration showing a typical capacitive micro pressure sensing member.
Figure 2:
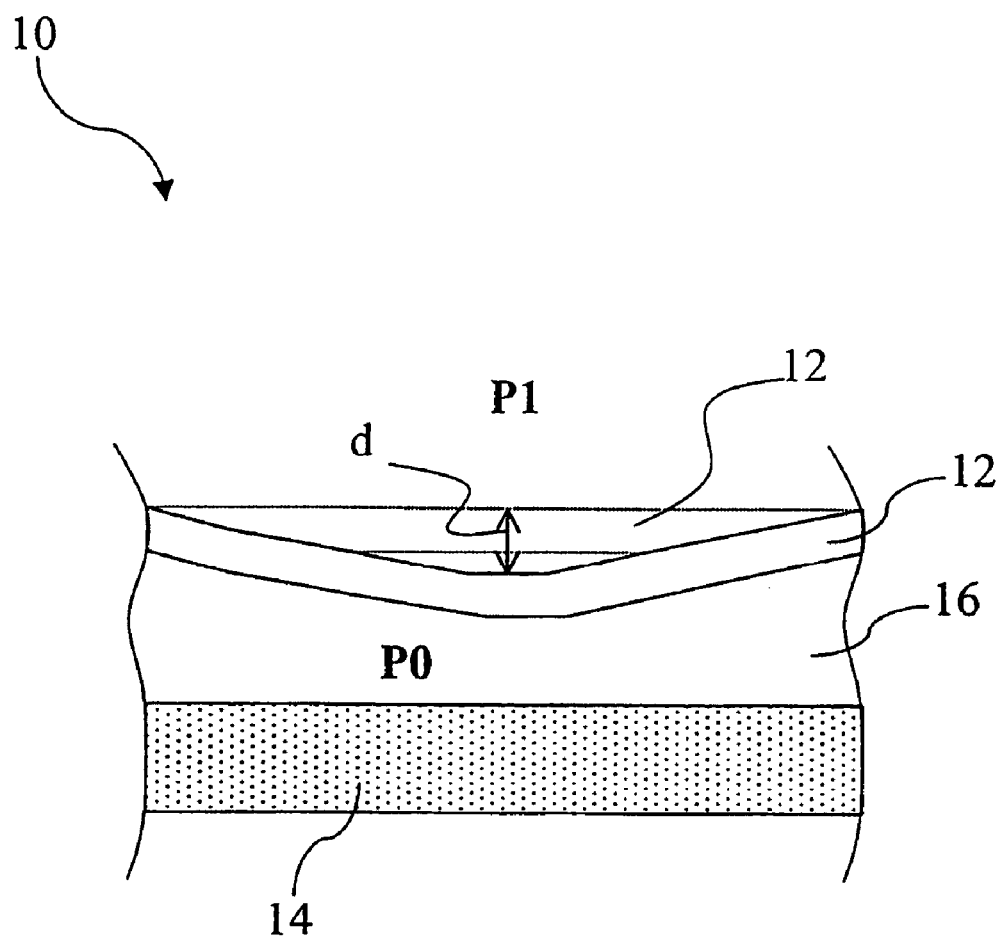
FIG. 2 is a schematic illustration showing deformation of a floating electrode of the typical capacitive micro pressure sensing member.

The invention utilizes a two-level suspended structure to make the center portion of the second suspended structure layer generate the maximum deformation displacement owing to the variation of the external pressure. The maximum deformation displacement may cause the first suspended structure layer to translate and also make the first suspended structure layer generate its maximum translation displacement so that the maximum sense capacitance variation may be generated. With this structure invention, a ten times more sensitive pressure sensor with the same area definition as the typical structure as shown in FIG. 1 can be obtained. Consequently, the invention may be kept at good sensitivity while the area of the sensing members is reduced. When the sensing member of the invention is spread over the application for sensing the fingerprint ridge pressure, the original shapes of the fingerprint ridges may be actually reproduced, and the excellent recognition ability may be obtained.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A capacitive micro pressure sensing member, comprising:
   a substrate;
   a first suspended structure located above the substrate and including a suspended thin plate and at least one compliant suspension arm connected to the suspended thin plate;
   a first protrusion structure arranged at a center portion of a top surface of the suspended thin plate; and
   a second suspended structure arranged on a top surface of the first protrusion structure with a center portion of the second suspended structure contacting the first protrusion structure, the second suspended structure covering the first suspended structure to form a sealed chamber together with the substrate, wherein the suspended thin plate is movable in the sealed chamber relative to the substrate so that a distance from the suspended thin plate to the substrate is changed.

2. The capacitive micro pressure sensing member according to claim 1, wherein a floating electrode is included in the suspended thin plate to form a sense capacitor between the substrate and the floating electrode.

3. The capacitive micro pressure sensing member according to claim 1, wherein the second suspended structure is a diaphragm structure.

4. The capacitive micro pressure sensing member according to claim 1, further comprising a second protrusion structure arranged on a top surface of the second suspended structure to serve as a stress concentration point for pressure application.

5. A fingerprint sensor, comprising:
a sensor substrate; and
a plurality of capacitive micro pressure sensing members arranged on a top surface of the sensor substrate to form a pressure sensing members array, wherein each of the capacitive micro pressure sensing members comprises:
a member substrate;
a first suspended structure located above the member substrate and including a suspended thin plate and at least one compliant suspension and connected to the suspended thin plate;
a first protrusion structure arranged at a center portion of a top surface of the suspended thin plate; and
a second suspended structure arranged on a top surface of the first protrusion structure with a center portion of the second suspended structure contacting the first protrusion structure, the second suspended structure covering the first suspended structure to form a sealed chamber together with the member substrate, wherein the suspended thin plate is movable in the sealed chamber relative to the member substrate so that a distance from the suspended thin plate to the member substrate is changed.

6. The fingerprint sensor according to claim 5, wherein the sensor substrate is a silicon substrate.

7. The fingerprint sensor according to claim 5, wherein a floating electrode is included in the suspended thin plate to form a sense capacitor between the member substrate and the floating electrode.

8. The fingerprint sensor according to claim 5, wherein the second suspended structure is a diaphragm structure.

9. The fingerprint sensor according to claim 5, wherein each of the capacitive micro pressure sensing members further comprises a second protrusion structure arranged on a top surface of the second suspended structure to serve as a stress concentration point for pressure application.

* * * * *